United States Patent
Jiang et al.

(10) Patent No.: US 10,306,646 B2
(45) Date of Patent: May 28, 2019

(54) METHOD FOR DEVICE-TO-DEVICE COMMUNICATION, BASE STATION AND USER EQUIPMENT

(71) Applicant: Sharp Kabushiki Kaisha, Sakai, Osaka (JP)

(72) Inventors: Qi Jiang, Shanghai (CN); Renmao Liu, Shanghai (CN); Bo Li, Shanghai (CN)

(73) Assignee: SHARP KABUSHIKI KAISHA, Sakai (JP)

( * ) Notice: Subject to any disclaimer, the term of this patent is extended or adjusted under 35 U.S.C. 154(b) by 54 days.

(21) Appl. No.: 15/309,072

(22) PCT Filed: May 6, 2015

(86) PCT No.: PCT/CN2015/078396
§ 371 (c)(1),
(2) Date: Nov. 4, 2016

(87) PCT Pub. No.: WO2015/169227
PCT Pub. Date: Nov. 12, 2015

(65) Prior Publication Data
US 2017/0079025 A1    Mar. 16, 2017

(30) Foreign Application Priority Data
May 7, 2014 (CN) .......................... 2014 1 0200178

(51) Int. Cl.
*H04W 72/04* (2009.01)
*H04W 72/12* (2009.01)
*H04B 1/715* (2011.01)

(52) U.S. Cl.
CPC ....... *H04W 72/048* (2013.01); *H04W 72/042* (2013.01); *H04W 72/0453* (2013.01);
(Continued)

(58) Field of Classification Search
CPC .......... H04W 72/0453; H04W 72/048; H04W 72/042
See application file for complete search history.

(56) References Cited

U.S. PATENT DOCUMENTS

2013/0322413 A1* 12/2013 Pelletier ............ H04W 72/1289
370/336
2014/0177564 A1   6/2014  Ma et al.
(Continued)

FOREIGN PATENT DOCUMENTS

| CN | 103002578 A | 3/2013 |
| WO | 2013/026359 A1 | 2/2013 |
| WO | 2013/133576 A1 | 9/2013 |

OTHER PUBLICATIONS

Qualcomm Incorporated, "eNB resource allocation for D2D broadcast communication", 3GPP TSG-RAN WG1 #76BIS, R1-141451, Mar. 31-Apr. 4, 2014, 6 pages.
(Continued)

*Primary Examiner* — Redentor Pasia
(74) *Attorney, Agent, or Firm* — Keating & Bennett, LLP

(57) ABSTRACT

The present disclosure provides a method in a base station for resource configuration for Device-to-Device (D2D) Scheduling Assignment (SA) and/or D2D data transmissions for a User Equipment (UE) and a corresponding UE. The base station transmits resource configuration for the D2D SA and/or D2D data transmissions to the UE. Frequency hopping schemes for the D2D SA and/or D2D data transmissions within one subframe or between subframes are predefined at network side. The UE obtains schemes for D2D SA and/or D2D data transmissions in time domain based on the resource configuration for the D2D SA and/or D2D data transmissions transmitted from the base station. The UE obtains schemes for D2D SA and/or D2D data transmissions in time domain based on the frequency hop-
(Continued)

ping schemes for the D2D SA and/or D2D data transmissions within one subframe or between subframes are predefined the at network side.

6 Claims, 5 Drawing Sheets

(52) U.S. Cl.
CPC ......... *H04W 72/1215* (2013.01); *H04B 1/715* (2013.01); *H04B 2001/7152* (2013.01)

(56) References Cited

U.S. PATENT DOCUMENTS

| | | | |
|---|---|---|---|
| 2015/0009910 A1* | 1/2015 | Ryu | H04W 72/04 370/329 |
| 2015/0049694 A1 | 2/2015 | Choi et al. | |
| 2015/0271807 A1* | 9/2015 | Patil | H04W 76/14 455/426.1 |
| 2015/0271818 A1* | 9/2015 | Tavildar | H04B 1/69 375/138 |

OTHER PUBLICATIONS

Qualcomm Incorporated, "Control for D2D broadcast communication", 3GPP TSG-RAN WG1 #76BIS, R1-141448, Mar. 31-Apr. 4, 2014, 7 pages.
Official Communication issued in International Patent Application No. PCT/CN2015/078396, dated Jul. 28, 2015.
Intel Corporation, "Discussion on D2D Operation within Network Coverage (Mode-1)", 3GPP TSG RAN WG1 Meeting #76bis, R1-141164, Mar. 31-Apr. 4, 2014, pp. 1-7.
Official Communication issued in Japanese Patent Application No. 2016-567007, dated Jan. 22, 2019.
ZTE; "Resource Allocation for D2D Discovery"; 3GPP TSG-RAN WG1 #76bis; R1-141426; Mar. 31-Apr. 4, 2014; pp. 1-6.

* cited by examiner

METHOD FOR DEVICE-TO-DEVICE COMMUNICATION, BASE STATION AND USER EQUIPMENT

TECHNICAL FIELD

The present disclosure relates to wireless communications, and more particularly, to a method for Device-to-Device (D2D) communication, a base station and a User Equipment (UE).

BACKGROUND

Modern wireless mobile communication systems have two significant characteristics. The first one is broadband and high rate. For example, the fourth generation wireless mobile communication systems have up to 100 MHz of bandwidth and up to 1 Gbps of downlink rate. The second one is mobile interconnecting, which enables emerging services such as mobile internet, mobile video on demand, online navigation, and the like. These two characteristics have higher requirements on the wireless mobile communication technology, including ultrahigh rate wireless transmission, inter-area interference suppression, reliable signal transmission while moving, distributed/centered signal processing, etc. In the enhanced fourth generation (4G) and the fifth generation (5G) in the future, in order to meet the above development requirements, various key techniques have been proposed and discussed, and are worth extensive attention of researchers in the related field.

The enhanced fourth generation wireless mobile communication systems have generally the following development requirements:

- Higher wireless broadband rate and optimization of local cell hot spots;
- Further improved user experience, especially optimization of communication services for cell border areas;
- Continuous researches on new techniques capable of improving spectral utilization, due to impossibility of 1,000 times of expansion of available spectrums;
- Use of high frequency spectrums (5 GHz or even higher) to obtain large communication bandwidth;
- Cooperation with existing networks (2G/3G/4G, WLAN, WiMax, etc.) to share data traffic;
- Specific optimization for different traffics, applications and services;
- Enhanced system capabilities for supporting large scale Machine Type Communications;
- Flexible, intelligent and inexpensive network planning and deployment; and
- Designs for saving power consumptions of networks and UE batteries.

In order to achieve the above development requirements, the $3^{rd}$ Generation Partner Project (3GPP) organization has discussed and accepted Device-to-Device (D2D) communication technique as a key technique in the enhanced fourth generation wireless mobile communication systems.

The D2D technique allows local communications or peer-to-peer communications, without access to core networks. With transmissions based on the D2D technique, loads on base stations can be effectively reduced and life time of mobile terminal batteries can be effectively prolonged. Generally, according to the whether there is coverage of a macro base station in the environment where UEs for D2D transmissions (referred to as D2D UEs hereinafter) are located, scenarios for the D2D UEs can be divided into network coverage, no network coverage and partial network coverage. In the partial network coverage scenario, there are D2D UEs with network coverage and D2D UEs without network coverage.

Currently, for D2D communications, especially those with coverage of base station, 3GPP has decided to use Physical Downlink Control Channel (PDCCH) and Enhanced PDCCH (EPDCCH) for transmitting D2D grant information for D2D Scheduling Assignment (SA) and D2D data. However, there is no specific solution regarding how to use the existing PDCCH and EPDCCH to schedule D2D SA and D2D data, particularly which time-frequency resource positions are to be used to transmit D2D SA and D2D data.

There is thus a need for new indications from the base station, or predefined schemes, to solve the problem regarding which time-frequency resource positions are to be used to transmit D2D SA and D2D data.

SUMMARY

In order to solve the above problem, the present disclosure provides a resource configuration method for transmission of D2D SA and D2D data for a D2D UE based on Long Term Evolution (LTE) and LTE-Advanced (LTE-A) networks. The present disclosure also provides a method for receiving such resource configuration. Further, the present disclosure provides a method for obtaining time-frequency positions for transmission of D2D SA and D2D data based on frequency hopping predefined at the base station side.

In particular, in a first aspect of the present disclosure, a method performed by a base station is provided. The method comprises: configuring resources required for Device-to-Device (D2D) Scheduling Assignment (SA) and/or D2D data transmissions based on radio resource occupations by cellular network and D2D communications within coverage of the base station; and transmitting resource configuration information for the D2D SA and/or D2D data transmissions.

In an embodiment, the resource configuration information indicates the number of subframes in a set of subframes allocated for D2D transmission and/or an interval between every two adjacent subframes in the set of subframes.

In an embodiment, the subframes allocated for the D2D SA and/or D2D data in the set of subframes are equally spaced in time domain.

In a second aspect of the present disclosure, a method performed by a User Equipment (UE) is provided. The method comprises: receiving resource configuration information for Device-to-Device (D2D) Scheduling Assignment (SA) and/or D2D data transmissions; and configuring positions of subframes where Physical Resource Blocks (PRBs) for the D2D SA and/or D2D data transmissions are located, based on the resource configuration information.

In an embodiment, the resource configuration information indicates the number of subframes in a set of subframes allocated for D2D transmission and/or an interval between every two adjacent subframes in the set of subframes.

In an embodiment, the subframes allocated for the D2D SA and/or D2D data in the set of subframes are equally spaced in time domain.

In a third aspect of the present disclosure, a method performed by a User Equipment (UE) is provided. The method comprises: receiving information including a predefined frequency hopping scheme from an eNB; and obtaining positions of Physical Resource Blocks (PRBs) occupied by a Device-to-Device (D2D) Scheduling Assignment (SA) and/or D2D data in frequency domain based on the predefined frequency hopping scheme included in the received information.

In an embodiment, the predefined frequency hopping scheme indicates that PRBs for transmission of the D2D SA and/or D2D data between two time slots within one subframe are frequency hopped in accordance with a frequency hopping scheme for Physical Uplink Shared Channel (PUSCH).

In an embodiment, the predefined frequency hopping scheme indicates that PRBs for transmission of the D2D SA and/or D2D data between two adjacent subframes in a set of subframes allocated for D2D transmission are frequency hopped in accordance with a fixed scheme.

In an embodiment, a start position of PRBs for transmission of the D2D SA and/or D2D data in a first subframe in the set of subframes is generated from D2D scheduling information in Physical Downlink Control Channel (PDCCH) or Enhanced PDCCH (EPDCCH) from a base station, and positions of PRBs for transmission of the D2D SA in subsequent subframes in the set of subframes are generated from the start position of PRBs and subframe numbers.

In an embodiment, a start position of PRBs for transmission of the D2D SA and/or D2D data in a first subframe in the set of subframes is generated from an identity of a D2D group to which the UE belongs and D2D scheduling information in PDCCH or EPDCCH from a base station, and positions of PRBs for transmission of the D2D SA and/or D2D data in subsequent subframes in the set of subframes are generated from the start position of PRBs and subframe numbers.

In an embodiment, a start position of PRBs for transmission of the D2D SA and/or D2D data in a first subframe in the set of subframes is generated from an identity specific to the UE and D2D scheduling information in PDCCH or EPDCCH from a base station, and positions of PRBs for transmission of the D2D SA and/or D2D data in subsequent subframes in the set of subframes are generated from the start position of PRBs and subframe numbers.

In an embodiment, a start position of PRBs for transmission of the D2D SA and/or D2D data in a first subframe in the set of subframes is generated from a physical identity of a cell serving the UE and D2D scheduling information in PDCCH or EPDCCH from a base station, and positions of PRBs for transmission of the D2D SA and/or D2D data in subsequent subframes in the set of subframes are generated from the start position of PRBs and subframe numbers.

In an embodiment, a start position of PRBs for transmission of the D2D SA and/or D2D data in a first subframe in the set of subframes is generated from an identity specific to D2D transmission and D2D scheduling information in PDCCH or EPDCCH from a base station, and positions of PRBs for transmission of the D2D SA and/or D2D data in subsequent subframes in the set of subframes are generated from the start position of PRBs and subframe numbers.

In a fourth aspect of the present disclosure, a base station is provided. The base station comprises: a configuration unit configured to configure resources required for Device-to-Device (D2D) Scheduling Assignment (SA) and/or D2D data transmissions based on radio resource occupations by cellular network and D2D communications within coverage of the base station; and a transmission unit configured to transmit resource configuration information for the D2D SA and/or D2D data transmissions.

In an embodiment, the resource configuration information indicates the number of subframes in a set of subframes allocated for D2D transmission and/or an interval between every two adjacent subframes in the set of subframes.

In an embodiment, the subframes allocated for the D2D SA and/or D2D data in the set of subframes are equally spaced in time domain.

In a fifth aspect of the present disclosure, a User Equipment (UE) is provided. The UE comprises: a receiving unit configured to receive resource configuration information for Device-to-Device (D2D) Scheduling Assignment (SA) and/or D2D data transmissions; and a configuration unit configured to configure positions of subframes where Physical Resource Blocks (PRBs) for the D2D SA and/or D2D data transmissions are located, based on the resource configuration information.

In an embodiment, the resource configuration information indicates the number of subframes in a set of subframes allocated for D2D transmission and/or an interval between every two adjacent subframes in the set of subframes.

In an embodiment, the subframes allocated for the D2D SA and/or D2D data in the set of subframes are equally spaced in time domain.

In a sixth aspect of the present disclosure, a User Equipment (UE) is provided. The UE comprises: a receiving unit configured to receive information including a predefined frequency hopping scheme from an eNB; and a configuration unit configured to obtain positions of Physical Resource Blocks (PRBs) occupied by a Device-to-Device (D2D) Scheduling Assignment (SA) and/or D2D data in frequency domain based on the predefined frequency hopping scheme included in the received information.

In an embodiment, the predefined frequency hopping scheme indicates that PRBs for transmission of the D2D SA and/or D2D data between two time slots within one subframe are frequency hopped in accordance with a frequency hopping scheme for Physical Uplink Shared Channel (PUSCH).

In an embodiment, the predefined frequency hopping scheme indicates that PRBs for transmission of the D2D SA and/or D2D data between two adjacent subframes in a set of subframes allocated for D2D transmission are frequency hopped in accordance with a fixed scheme.

In an embodiment, a start position of PRBs for transmission of the D2D SA and/or D2D data in a first subframe in the set of subframes is generated from D2D scheduling information in Physical Downlink Control Channel (PDCCH) or Enhanced PDCCH (EPDCCH) from a base station, and positions of PRBs for transmission of the D2D SA and/or D2D data in subsequent subframes in the set of subframes are generated from the start position of PRBs and subframe numbers.

In an embodiment, a start position of PRBs for transmission of the D2D SA and/or D2D data in a first subframe in the set of subframes is generated from an identity of a D2D group to which the UE belongs and D2D scheduling information in PDCCH or EPDCCH from a base station, and positions of PRBs for transmission of the D2D SA and/or D2D data in subsequent subframes in the set of subframes are generated from the start position of PRBs and subframe numbers.

In an embodiment, a start position of PRBs for transmission of the D2D SA and/or D2D data in a first subframe in the set of subframes is generated from an identity specific to the UE and D2D scheduling information in PDCCH or EPDCCH from a base station, and positions of PRBs for transmission of the D2D SA and/or D2D data in subsequent subframes in the set of subframes are generated from the start position of PRBs and subframe numbers.

In an embodiment, a start position of PRBs for transmission of the D2D SA and/or D2D data in a first subframe in the set of subframes is generated from a physical identity of a cell serving the UE and D2D scheduling information in PDCCH or EPDCCH from a base station, and positions of PRBs for transmission of the D2D SA and/or D2D data in subsequent subframes in the set of subframes are generated from the start position of PRBs and subframe numbers.

In an embodiment, a start position of PRBs for transmission of the D2D SA and/or D2D data in a first subframe in the set of subframes is generated from an identity specific to D2D transmission and D2D scheduling information in PDCCH or EPDCCH from a base station, and positions of PRBs for transmission of the D2D SA and/or D2D data in subsequent subframes in the set of subframes are generated from the start position of PRBs and subframe numbers.

BRIEF DESCRIPTION OF THE DRAWINGS

The above and other objects, features and advantages will be more apparent from the following description of embodiments with reference to the figures, in which.

DETAILED DESCRIPTION

In the following, a method in a base station for indicating a timing relationship between D2D SA information and D2D enablement and a method in a UE for acting in response to receiving the indication according to the present disclosure will be explained in detail with reference to the figures and embodiments. It should be noted that the following embodiments are illustrative only, rather than limiting the scope of the present disclosure. In the following description, details of well known techniques which are not directly relevant to the present invention will be omitted so as not to obscure the concept of the invention.

In the following, a number of embodiments of the present invention will be detailed in an exemplary application environment of LTE mobile communication system and its subsequent evolutions. Herein, it is to be noted that the present invention is not limited to the application exemplified in the embodiments. Rather, it is applicable to other communication systems, such as the future 5G cellular communication system.

Figure 1:
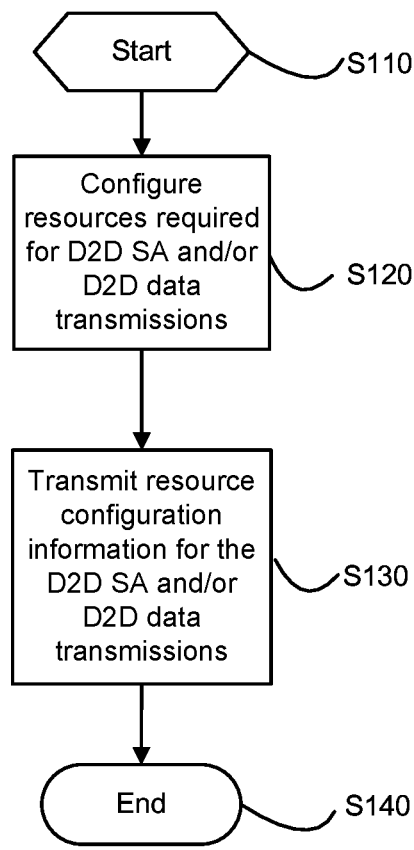
FIG. 1 is a flowchart illustrating a method in a base station for transmitting resource configuration information for D2D SA and/or D2D data transmissions according to an embodiment of the present disclosure.

FIG. 1 is a flowchart illustrating a method in a base station for transmitting resource configuration information for D2D SA and/or D2D data transmissions according to an embodiment of the present disclosure. As shown in FIG. 1, the method starts with step S110.

At step S120, the base station configures resources required for Device-to-Device (D2D) Scheduling Assignment (SA) and/or D2D data transmissions based on radio resource occupations by cellular network and D2D communications within coverage of the base station.

At step S130, the base station transmits resource configuration information for the D2D SA and/or D2D data transmissions. Preferably, the resource configuration information indicates the number of subframes in a set of subframes allocated for D2D transmission and/or an interval between every two adjacent subframes in the set of subframes. More preferably, the subframes allocated for the D2D SA and/or D2D data in the set of subframes are equally spaced in time domain.

In an embodiment, the resource configuration information may be included in bits in an existing DCI format transmitted over PDCCH or EPDCCH. For example, if the transmitted DCI format is Format 0, unused bits in the D2D Grant can be used for transmission. For example, some or all of the bits in New Data Indicator, Transmit Power Control (TPC) Command, Cyclic Shift, Uplink (UL) Index, Downlink Assignment Index, Channel State Information (CSI) Request, Sounding Reference Signal (SRS) Request, or Resource Allocation Type can be used for transmission of the resource configuration information.

Alternatively, the resource configuration information can be included in bits in a newly designed DCI format transmitted over PDCCH or EPDCCH.

Further, the resource configuration information can be included in a System Information Broadcast (SIB) block, which can be an existing SIB or a newly designed SIB.

Further, the resource configuration information can be included in a UE-specific Radio Resource Control (RRC) signaling. In this case, the UE-specific RRC signaling may be e.g., RadioResourceConfigDedicated Information Element (IE). Alternatively, the UE-specific RRC signaling can be an RRCConnectionSetup message, or other UE-specific RRC signaling.

Finally, the method ends at step S140.

Figure 2:
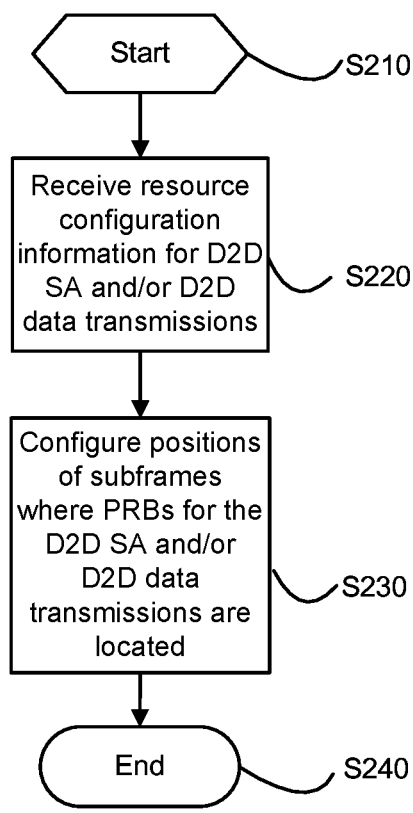
FIG. 2 is a flowchart illustrating a method in a UE for configuration D2D transmission based on resource configuration information for D2D SA and/or D2D data transmissions from a base station according to an embodiment of the present disclosure.

FIG. 2 is a flowchart illustrating a method in a UE for configuration D2D transmission based on resource configuration information for D2D SA and/or D2D data transmissions from a base station according to an embodiment of the present disclosure. As shown in FIG. 2, the method starts with step S210.

At step S220, the UE receives resource configuration information for Device-to-Device (D2D) Scheduling Assignment (SA) and/or D2D data transmissions. Preferably, the resource configuration information indicates the number of subframes in a set of subframes allocated for D2D transmission and/or an interval between every two adjacent subframes in the set of subframes. More preferably, the subframes allocated for the D2D SA and/or D2D data in the set of subframes are equally spaced in time domain.

At step S230, the UE configures positions of subframes where Physical Resource Blocks (PRBs) for the D2D SA and/or D2D data transmissions are located, based on the resource configuration information.

Finally, the method ends at step S240.

Figure 3:
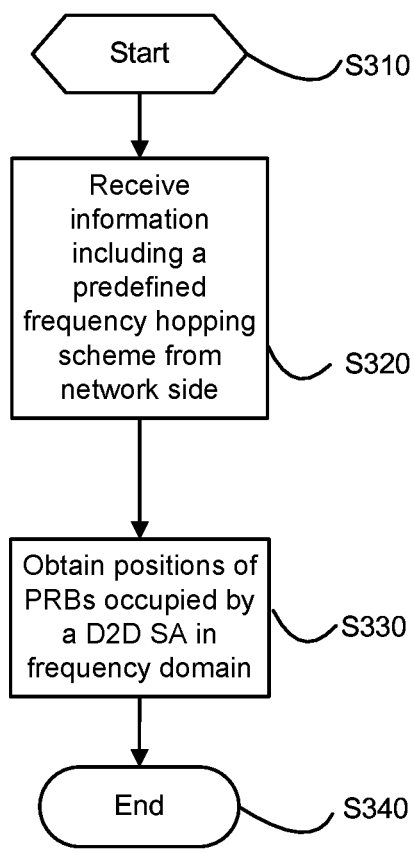
FIG. 3 is a flowchart illustrating a method in a UE for configuring D2D transmissions based on information predefined at a network side according to an embodiment of the present disclosure.

FIG. 3 is a flowchart illustrating a method in a UE for configuring D2D transmissions based on information predefined at a network side according to an embodiment of the present disclosure. As shown in FIG. 3, the method starts with step S310.

At step S320, the UE receives information including a predefined frequency hopping scheme.

At step S330, the UE obtains positions of Physical Resource Blocks (PRBs) occupied by a Device-to-Device (D2D) Scheduling Assignment (SA) in frequency domain based on the predefined frequency hopping scheme included in the received information. For example, the predefined frequency hopping scheme may include frequency hopping between time slots within one subframe of the PRBs occupied by the D2D SA in the frequency domain and frequency hopping between subframes in a set of subframes.

In an embodiment, the frequency hopping between time slots within one subframe is a frequency hopping scheme for Physical Uplink Shared Channel (PUSCH) transmission.

In an embodiment, a start position of PRBs for transmission of the D2D SA in a first subframe in the set of subframes is generated from D2D scheduling information in Physical Downlink Control Channel (PDCCH) or Enhanced PDCCH (EPDCCH) from a base station. Positions of PRBs for transmission of the D2D SA in subsequent subframes in the set of subframes are generated from the start position of PRBs and subframe numbers.

In an embodiment, a start position of PRBs for transmission of the D2D SA and/or D2D data in a first subframe in the set of subframes is generated from an identity of a D2D group to which the UE belongs and D2D scheduling information in PDCCH or EPDCCH from a base station. Positions of PRBs for transmission of the D2D SA and/or D2D data in subsequent subframes in the set of subframes are generated from the start position of PRBs and subframe numbers.

In an embodiment, a start position of PRBs for transmission of the D2D SA and/or D2D data in a first subframe in the set of subframes is generated from an identity specific to the UE and D2D scheduling information in PDCCH or EPDCCH from a base station. Positions of PRBs for transmission of the D2D SA and/or D2D data in subsequent subframes in the set of subframes are generated from the start position of PRBs and subframe numbers.

In an embodiment, a start position of PRBs for transmission of the D2D SA and/or D2D data in a first subframe in the set of subframes is generated from a physical identity of a cell serving the UE and D2D scheduling information in PDCCH or EPDCCH from a base station. Positions of PRBs for transmission of the D2D SA and/or D2D data in subsequent subframes in the set of subframes are generated from the start position of PRBs and subframe numbers.

In an embodiment, a start position of PRBs for transmission of the D2D SA and/or D2D data in a first subframe in the set of subframes is generated from an identity specific to D2D transmission and D2D scheduling information in PDCCH or EPDCCH from a base station. Positions of PRBs for transmission of the D2D SA and/or D2D data in subsequent subframes in the set of subframes are generated from the start position of PRBs and subframe numbers.

Finally, the method ends at step S340.

Figure 4:
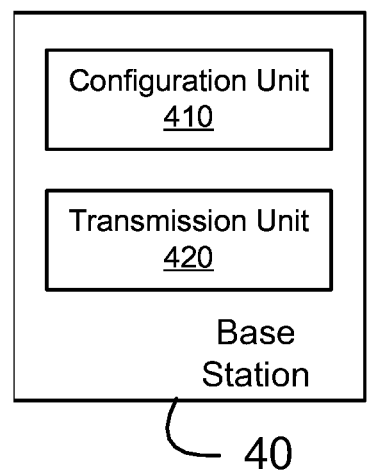
FIG. 4 is a block diagram of a base station according to an embodiment of the present disclosure.

FIG. 4 is a block diagram of a base station according to an embodiment of the present disclosure. As shown in FIG. 4, the base station 40 includes a configuration unit 410 and a transmission unit 420.

The configuration unit 410 is configured to configure resources required for Device-to-Device (D2D) Scheduling Assignment (SA) and/or D2D data transmissions based on radio resource occupations by cellular network and D2D communications within coverage of the base station.

The transmission unit 420 is configured to transmit resource configuration information for the D2D SA and/or D2D data transmissions. Preferably, the resource configuration information indicates the number of subframes in a set of subframes allocated for D2D transmission and/or an interval between every two adjacent subframes in the set of subframes. More preferably, the subframes allocated for the D2D SA and/or D2D data in the set of subframes are equally spaced in time domain.

Figure 5:
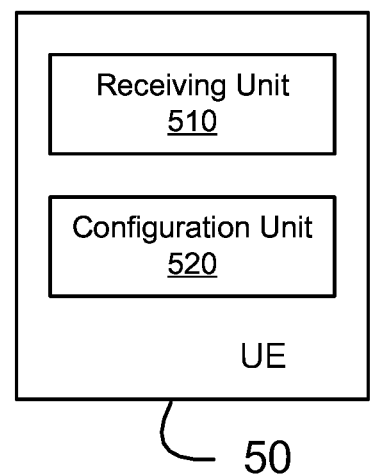
FIG. 5 is a block diagram of a UE according to an embodiment of the present disclosure.

FIG. 5 is a block diagram of a UE according to an embodiment of the present disclosure. As shown in FIG. 5, the UE 50 includes a receiving unit 510 and a configuration unit 520.

The receiving unit 510 is configured to receive resource configuration information for Device-to-Device (D2D) Scheduling Assignment (SA) and/or D2D data transmissions.

The configuration unit 520 is configured to configure positions of subframes where Physical Resource Blocks (PRBs) for the D2D SA and/or D2D data transmissions are located, based on the resource configuration information. Preferably, the resource configuration information indicates the number of subframes in a set of subframes allocated for D2D transmission and/or an interval between every two adjacent subframes in the set of subframes. More preferably, the subframes allocated for the D2D SA and/or D2D data in the set of subframes are equally spaced in time domain.

Further, the receiving unit 510 can further be configured to receive information including a predefined frequency hopping scheme. The configuration unit 520 can further be configured to obtain positions of Physical Resource Blocks (PRBs) occupied by a Device-to-Device (D2D) Scheduling Assignment (SA) in frequency domain based on the predefined frequency hopping scheme included in the received information. In an example, the predefined frequency hopping scheme may indicate that PRBs for transmission of the D2D SA between two time slots within one subframe are frequency hopped in accordance with a frequency hopping scheme for Physical Uplink Shared Channel (PUSCH). Alternatively, the predefined frequency hopping scheme may indicate that PRBs for transmission of the D2D SA between two adjacent subframes in a set of subframes allocated for D2D transmission are frequency hopped in accordance with a fixed scheme.

For example, the predefined frequency hopping scheme may include frequency hopping between time slots within one subframe of the PRBs occupied by the D2D SA in the frequency domain and frequency hopping between subframes in a set of subframes.

In an embodiment, the frequency hopping between time slots within one subframe is a frequency hopping scheme for Physical Uplink Shared Channel (PUSCH) transmission.

In an embodiment, a start position of PRBs for transmission of the D2D SA in a first subframe in the set of subframes is generated from D2D scheduling information in Physical Downlink Control Channel (PDCCH) or Enhanced PDCCH (EPDCCH) from a base station. Positions of PRBs for transmission of the D2D SA in subsequent subframes in the set of subframes are generated from the start position of PRBs and subframe numbers.

In an embodiment, a start position of PRBs for transmission of the D2D SA in a first subframe in the set of subframes is generated from an identity of a D2D group to which the UE belongs and D2D scheduling information in PDCCH or EPDCCH from a base station. Positions of PRBs for transmission of the D2D SA in subsequent subframes in the set of subframes are generated from the start position of PRBs and subframe numbers.

In an embodiment, a start position of PRBs for transmission of the D2D SA in a first subframe in the set of subframes is generated from an identity specific to the UE and D2D scheduling information in PDCCH or EPDCCH from a base station. Positions of PRBs for transmission of the D2D SA in subsequent subframes in the set of subframes are generated from the start position of PRBs and subframe numbers.

In an embodiment, a start position of PRBs for transmission of the D2D SA in a first subframe in the set of subframes is generated from a physical identity of a cell serving the UE and D2D scheduling information in PDCCH or EPDCCH from a base station. Positions of PRBs for transmission of the D2D SA in subsequent subframes in the set of subframes are generated from the start position of PRBs and subframe numbers.

In an embodiment, a start position of PRBs for transmission of the D2D SA in a first subframe in the set of subframes is generated from an identity specific to D2D transmission and D2D scheduling information in PDCCH or EPDCCH from a base station. Positions of PRBs for transmission of the D2D SA in subsequent subframes in the set of subframes are generated from the start position of PRBs and subframe numbers.

It can be appreciated that the above embodiments of the present disclosure can be implemented in software, hardware or any combination thereof. For example, the internal components of the base station and the UE in the above embodiments can be implemented using various devices including, but not limited to, analog circuit device, digital circuit device, Digital Signal Processing (DSP) circuit, programmable processor, Application Specific Integrated Circuit (ASIC), Field Programmable Gate Array (FPGA), Programmable Logic Device (CPLD) and the like.

In the present disclosure, the term "base station" means a mobile communication data and control exchange center with a large transmit power and a wide coverage area and including functions such as resource allocation/scheduling, data reception/transmission and the like. The term "user equipment" means a user mobile terminal, including e.g., a mobile phone, a notebook computer and other terminal devices that can wirelessly communicate with a base station or and micro base station.

Further, the embodiments of the present disclosure can be implemented in computer program products. More specifically, a computer program product can be a product having a computer readable medium with computer program logics coded thereon. When executed on a computing device, the computer program logics provide operations for implementing the above solutions according to the present disclosure. When executed on at least one processor in a computing system, the computer program logics cause the processor to perform the operations (methods) according to the embodiments of the present disclosure.

This arrangement of the present disclosure is typically provided as software, codes and/or other data structures provided or coded on a computer readable medium (such as an optical medium, e.g., CD-ROM, a floppy disk or a hard disk), or firmware or micro codes on other mediums (such as one or more ROMs, RAMs or PROM chips), or downloadable software images or shared databases in one or more modules. The software, firmware or arrangement can be installed in a computing device to cause one or more processors in the computing device to perform the solutions according to the embodiments of the present disclosure.

The present disclosure has been described above with reference to the preferred embodiments thereof. It should be understood that various modifications, alternations and additions can be made by those skilled in the art without departing from the spirits and scope of the present disclosure. Therefore, the scope of the present disclosure is not limited to the above particular embodiments but only defined by the claims as attached and the equivalents thereof.

The invention claimed is:

1. A User Equipment (UE), comprising:
reception circuitry configured to receive information of a resource for transmissions of a Device-to-Device (D2D) Scheduling Assignment (SA); and
transmission circuitry configured to transmit the D2D SA with a predefined frequency hopping based on the information; wherein
a first resource block for the transmissions of the D2D SA is located in a first subframe in a set of subframes for the transmissions of the D2D SA,
a second resource block for the transmissions of the D2D SA is located in a second subframe, which is different from the first subframe, in the set of subframes,
the reception circuitry is configured to receive Radio Resource Control (RRC) signaling including another information of the resource,
the another information is used to configure, as subframes for the transmissions of the D2D SA, the first subframe and the second subframe, and
the another information is configuration information for the transmissions of the D2D SA but not for transmissions of D2D data.

2. The UE of claim 1, wherein a position of the first resource block in frequency domain is determined by the information; and
wherein a position of the second resource block in the frequency domain is determined at least by the position of the first resource block.

3. The UE of claim 1, wherein
the RRC signaling is a UE specific RRC signaling.

4. A method performed by a User Equipment (UE), comprising:
receiving information of a resource for transmissions of a Device-to-Device (D2D) Scheduling Assignment (SA);
receiving an Radio Resource Control (RRC) signaling including another information of the resource; and
transmitting the D2D SA with a predefined frequency hopping based on the information; wherein
a first resource block for the transmissions of the D2D SA is located in a first subframe in a set of subframes for the transmissions of the D2D SA,
a second resource block for the transmissions of the D2D SA is located in a second subframe, which is different from the first subframe, in the set of subframes,
the another information is used to configure, as subframes for the transmissions of the D2D SA, the first subframe and the second subframe, and
the another information is configuration information for the transmissions of the D2D SA but not for transmissions of D2D data.

5. The method of claim 4, wherein a position of the first resource block in frequency domain is determined by the information; and
wherein a position of the second resource block in the frequency domain is determined at least by the position of the first resource block.

6. The method of claim 4, wherein
the RRC signaling is a UE specific RRC signaling.

* * * * *